United States Patent [19]
Craig

[11] 3,940,926
[45] Mar. 2, 1976

[54] JET PROPULSION ENGINES
[76] Inventor: Alfred C. Craig, 12 Arley Road, Parkstone, Poole, Dorset, England
[22] Filed: Aug. 31, 1973
[21] Appl. No.: 393,440

[52] U.S. Cl.............. 60/226 R; 60/269; 60/39.18 C
[51] Int. Cl.².......................................... F02K 3/04
[58] Field of Search.......... 60/226 R, 269, 224, 225, 60/39.18 C, 39.33, 270 R, 270 S; 417/223

[56] References Cited
UNITED STATES PATENTS

| | | | |
|---|---|---|---|
| 2,448,824 | 9/1948 | Price | 417/223 |
| 2,565,324 | 8/1951 | Ray | 60/39.18 C |
| 2,930,205 | 3/1960 | Walker | 60/39.18 C |
| 2,952,973 | 9/1960 | Hall et al. | 60/39.18 C |
| 2,986,218 | 5/1961 | Wagner et al. | 60/39.18 C |
| 3,105,661 | 10/1963 | Ferri | 60/270 R |
| 3,587,766 | 6/1971 | Slade | 60/39.18 C |
| 3,609,967 | 10/1971 | Waldmann | 60/39.18 C |
| 3,719,428 | 3/1973 | Dettmering | 60/39.18 C |

FOREIGN PATENTS OR APPLICATIONS
582,686  9/1959  Canada.......................... 60/39.18 C Primary Examiner—William L. Freeh
Assistant Examiner—Robert E. Garrett
Attorney, Agent, or Firm—Frank J. Jordan

[57] ABSTRACT

A jet propulsion engine such as a gas turbine engine has an air compressor for supplying compressed air to the engine compressor stages. The air compressor is controllably and selectively driven by way of a disconnectable drive connection between the air compressor and a freely rotatable fan which is arranged in front of the air compressor and which in operation is rotated by the flow of intake air into the engine. A by-pass duct permits a part of the intake air to be by-passed around the air compressor and passed in variable proportions either to the engine compressor stages or directly out of a by-pass duct outlet.

2 Claims, 4 Drawing Figures

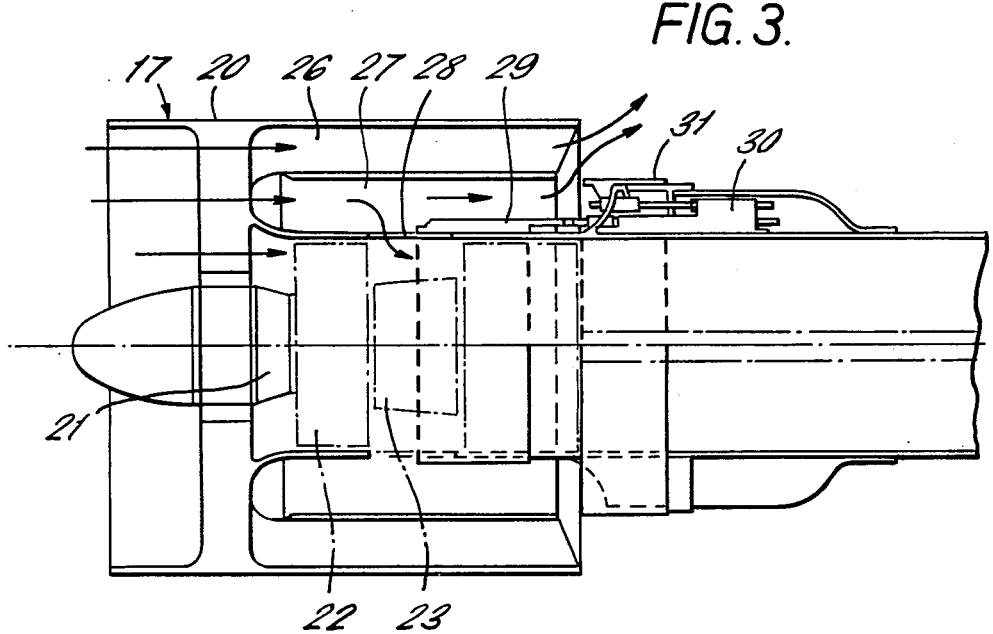
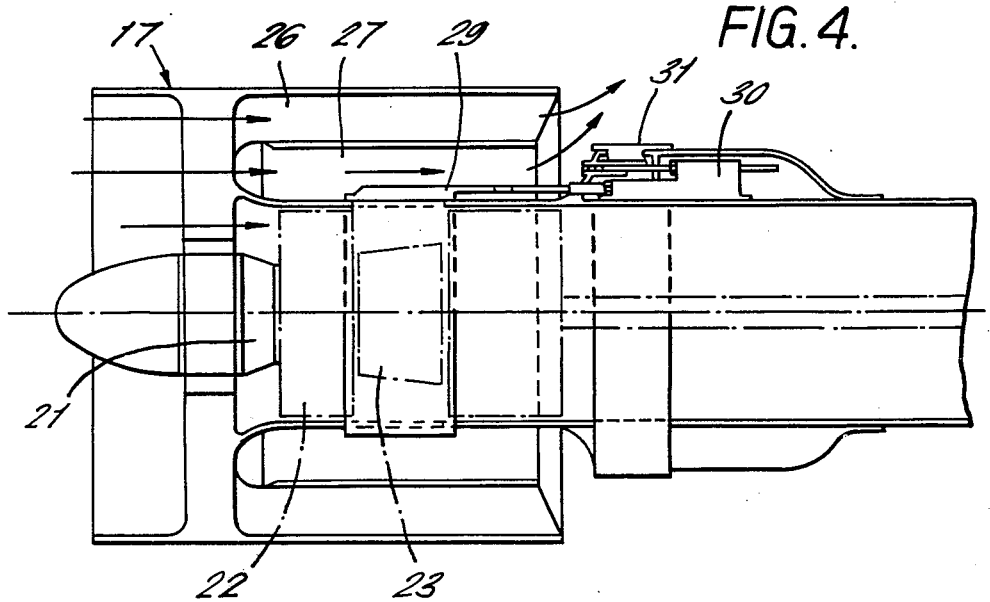

JET PROPULSION ENGINES

BACKGROUND OF THE INVENTION

The very high velocity air flowing into the air intake of a jet propulsion engine such as a gas turbine engine of an aircraft, is a potential source of power. In the aircraft engines which are at present in use however, this power is not utilised in developing the propulsive power of the engine.

Furthermore, it may be found that, during a major part of an aircraft flight, the aircraft is moving at such a speed that the volume of air taken into the jet propulsion engine exceeds that which can be accepted by the first stage of the engine air compressor system. The result of this is deceleration of the air on impact with the air intake and the front of the compressor rotor, and this causes a negative thrust along the line of flight.

SUMMARY OF THE INVENTION

It is an object of the present invention to provide a jet propulsion engine which utilises the kinetic energy of the high velocity air flow entering the air intake of the jet propulsion engine.

It is a further object of the invention to provide a jet propulsion engine which is capable of handling the full volume of the high velocity air flow which enters the air intake of the engine during normal operating conditions of the engine, for example during the major part of an aircraft flight.

It is yet another object of the present invention to provide an air-driven compressor in a jet propulsion engine, to provide a preliminary compression of the air intake flow passed to the engine air compressor system, thereby reducing the power required by the main engine turbine.

The jet propulsion engine of the invention has at its forward end a freely rotatable fan which can be driven by ram air flowing into the engine air intake. Located rearwardly of the fan is an air compressor for supplying compressed air to the engine and more particularly the main compressor means of the engine. The air compressor can be selectively controllably driven by the fan, to provide preliminary compression of the air flowing through the engine, before it reaches the main compressor means.

The fan and the air compressor can be selectively connectable by a disconnectable drive connection in the form of a fluid drive device. In addition, the air compressor can be connected to the main compressor means of the engine by a disconnectable drive coupling, and the coupling can be operated to connect the air compressor to the compressor means of the engine when the fan is developing an amount of power such that it cannot be effectively absorbed by the air compressor.

The engine can also have a valve-controlled by-pass duct for controlling air flow from the fan to the compressor means of the engine, the duct comprising two ducts which are arranged concentrically to each other and concentrically around the axis of the engine. The radially inner duct can be connected to the intake end of the compressor means of the engine, through an opening which is controllable by a valve. The rearwardly directed outlet of each of the two ducts can also be controlled by a valve. In a preferred embodiment, the valve controlling the communication between the radially inner duct and the intake end of the compressor means is combined in its operation with the valve controlling the outlet of the radially inner duct, in such a way that when the communication with the engine compressor means is progressively opened, the outlet of the radially inner duct is progressively closed, and vice-versa. Each of the valves can be in the form of a slide valve operable in accordance with the ram air pressure at the engine intake.

BRIEF DESCRIPTION OF THE DRAWINGS

FIG. 3 is a view similar to that of FIG. 2 with the valves shown in the position occupied during take-off and climbing of the aircraft; and FIG. 4 is a view similar to that of FIG. 2 with the valves shown in the position occupied during the cruising speed of the aircraft.

Figure 1:
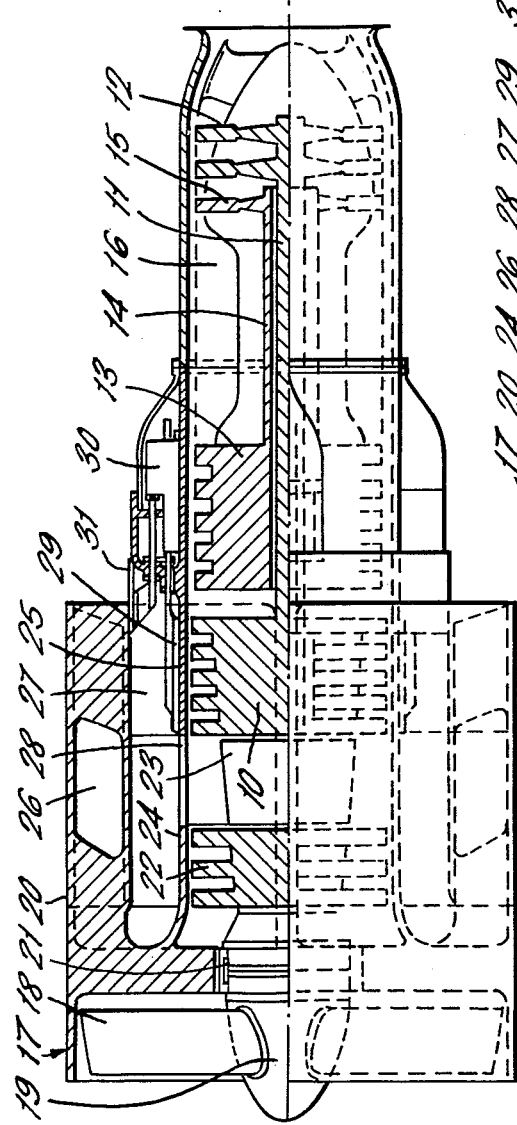
FIG. 1 is a diagrammatic side view of a gas turbine engine with the upper half shown in section.

The gas turbine engine comprises a low pressure axial flow compressor 10 connected by a rotor shaft 11 to a multi-stage low-pressure turbine 12. Compressed air from the low-pressure compressor 10 is fed to an axial flow high-pressure compressor 13 connected by a rotor shaft 14 to a high-pressure turbine 15. Located between the high-pressure compressor 13 and turbine 15 is an annular combustion chamber 16 to which fuel is supplied by a fuel control system (not shown).

Located at the forward end of the engine is a fan 17 comprising a plurality of fan rotor blades 18 mounted on a hub 19. The blades 18 which may be of variable incidence rotate within a housing 20 which supports a fluid drive device 21 located between the hub 19 and an axial flow compressor 22. Provided between the compressor 22 and the low-pressure compressor 10 is a disconnectable drive unit 23. The compressor 22 rotates within a casing 24 which forms part of the housing 20 and forms a continuation of the casing 25 of the low pressure compressor 10.

The housing 20 includes an outer annular duct 26 through which a proportion of the air discharged by the fan blades 18 passes before exhausting to atmosphere, and a by-pass duct 27 which also receives a proportion of the air discharged by the fan blades 18. The wall of the casing 24 is provided with an opening 28 which enables the by-pass duct 27 to be placed in communication with the interior of the casing 24 at a point between the discharge end of the compressor 22 and the intake end of the low-pressure compressor 10. The opening 28 is controlled by a slide valve 29 connected to an actuator 30. The actuator 30 is also connected to a slide valve 31 which can be moved to a position in which it closes off the outlet end of the by-pass duct 27. The opening 28 is gradually closed off by the valve 29 as the outlet end of the by-pass duct 27 is opened by the valve 31 and viceversa.

The gas turbine engine described above operates in the following manner, reference now being made to FIGS. 2 to 4 of the drawings.

Figure 2:
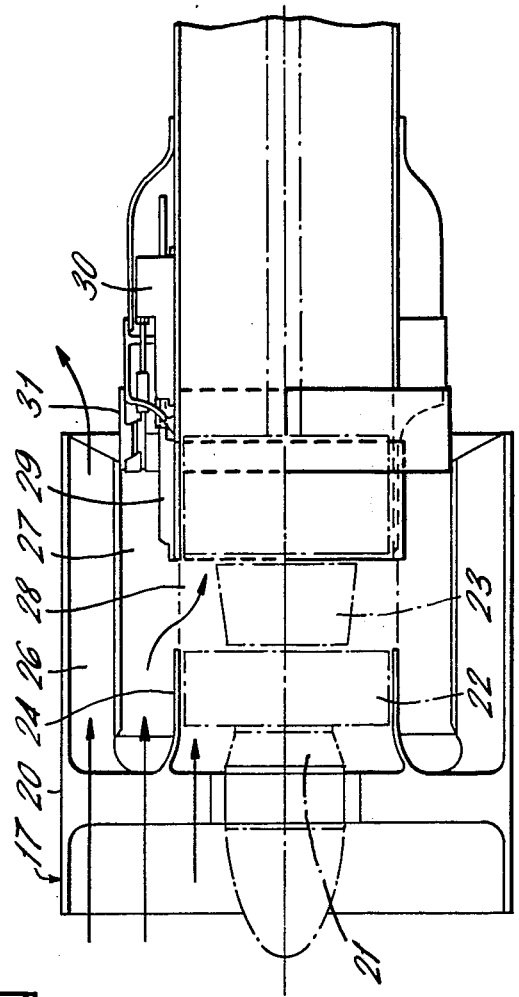
FIG. 2 is a diagrammatic side view of the engine with the closure valves for the by-pass duct shown in the position occupied during starting and static running of the engine.

When the aircraft in which the engine is mounted is static, the slide valve 29 is moved to a position in which the opening 28 is uncovered and the slide valve 31 is moved to a position in which the outlet end of the by-pass duct 27 is closed off (FIG. 2). The low pressure compressor 10, high pressure compressor 13 and associated turbines 12 and 15 are rotated and fuel supplied to and ignited in the combustion chamber 16. The low pressure compressor 10 receives air from the atmosphere which flows past the fan blades 18 and through the compressor 22 and air which flows from the by-pass duct 27 through the opening 28. The fan 17 is allowed to freely rotate and the compressor 22 will windmill.

As the aircraft moves forward and increases in forward velocity the opening 28 is gradually closed off by the valve member 29 and the outlet end of the by-pass duct 27 is gradually opened so that a reduced amount of air is supplied to the low pressure compressor from the by-pass duct 27 (FIG. 3). The actuator 30 is controlled by a control system sensitive to ram air pressure. The low pressure compressor 10 now receives a greater percentage of air from the compressor 22 which is driven by the fan 17 through the fluid coupling 21. At a predetermined aircraft forward speed, air density and ram air pressure rise the opening 28 will be completely closed and the outlet end of the by-pass duct 27 fully open so that all of the air required by the low pressure compressor 10 is received from the fan driven compressor 22 and a high proportion of the air from the fan 17 discharged rearwardly through the ducts 26 and 27 (FIG. 4).

When the fan 17 is developing an excess of power, i.e. power which cannot be effectively absorbed by the compressor 22, then the drive unit 23 is operated to connect the rotor of the compressor 22 with the low pressure compressor rotor 10 to assist in driving it.

The engine described provides a means for harnessing the kinetic energy of the air entering the gas turbine engine during operation. The fluid drive 21 provides the means by which the kinetic energy of the rotating fan 17 can be progressively transmitted to the compressor 22.

The very high velocity air entering the air intake of a gas turbine engine whilst in forward motion is a course of power which has not previously been harnessed effectively in existing gas turbine engines, i.e. pure jet engines, by-pass type and fan type gas turbine engines. The total power output from gas turbine engines make it possible to propel the aircraft powered by such engines at a forward velocity which for most of its flight is such that the volume of air exceeds that which can be accepted by the first stage of the engine air compressor system. The result is a deceleration of the air on impact with the engine air intake and the front of the compressor rotor resulting in a negative thrust along the line of flight. A certain amount of benefit is obtained from the ram pressure air but the velocity air stream striking the front of the engine is greater than the engine can handle. The kinetic energy of the air entering the engine air intake is not fully utilised in conventional gas turbine engines.

The air driven fan and compressor system of the engine described with reference to the drawings makes it possible to harness more effectively the energy of the high velocity air stream and therefore provides an independent source of compressor power. This independent source of power harnessed by the free fan compressor system makes possible the provision of a supplementary source of compressor power thereby reducing the power required by the main engine turbine.

I claim:

1. A jet propulsion engine comprising an air intake casing, a fan rotatable in the air intake casing, a main casing, an air compressor in the main casing, compressor means in the main casing rearwardly of the air compressor, a first disconnectable drive coupling between the fan and the air compressor, for the selective controllable driving of the air compressor by the fan, a second disconnectable drive coupling between the air compressor and the compressor means, for the selective controllable driving of the compressor means by the air compressor, a by-pass duct means having a rearwardly directed outlet and an aperture communicating with the compressor means, and valve means for varying the degree of opening of the outlet and the aperture whereby the proportion of the intake air flow passing from the fan to the compressor means and the proportion of the intake air flow passing from the fan through the by-pass duct means and out of the outlet is controllably varied inversely relative to each other.

2. A jet propulsion engine as claimed in claim 1 in which said compressor means has an intake, said by-pass duct means comprising two ducts which are concentric with each other and co-axial with said fan and which are located rearwardly of said fan, each duct having a rearwardly directed outlet and the radially inner duct having said aperature establishing communication between the inner duct and the intake of said compressor means, said valve means controlling said aperture and said opening of the inner duct.

* * * * *